May 19, 1931. H. A. KNOX 1,805,771
VEHICLE
Filed Nov. 4, 1929 2 Sheets-Sheet 2
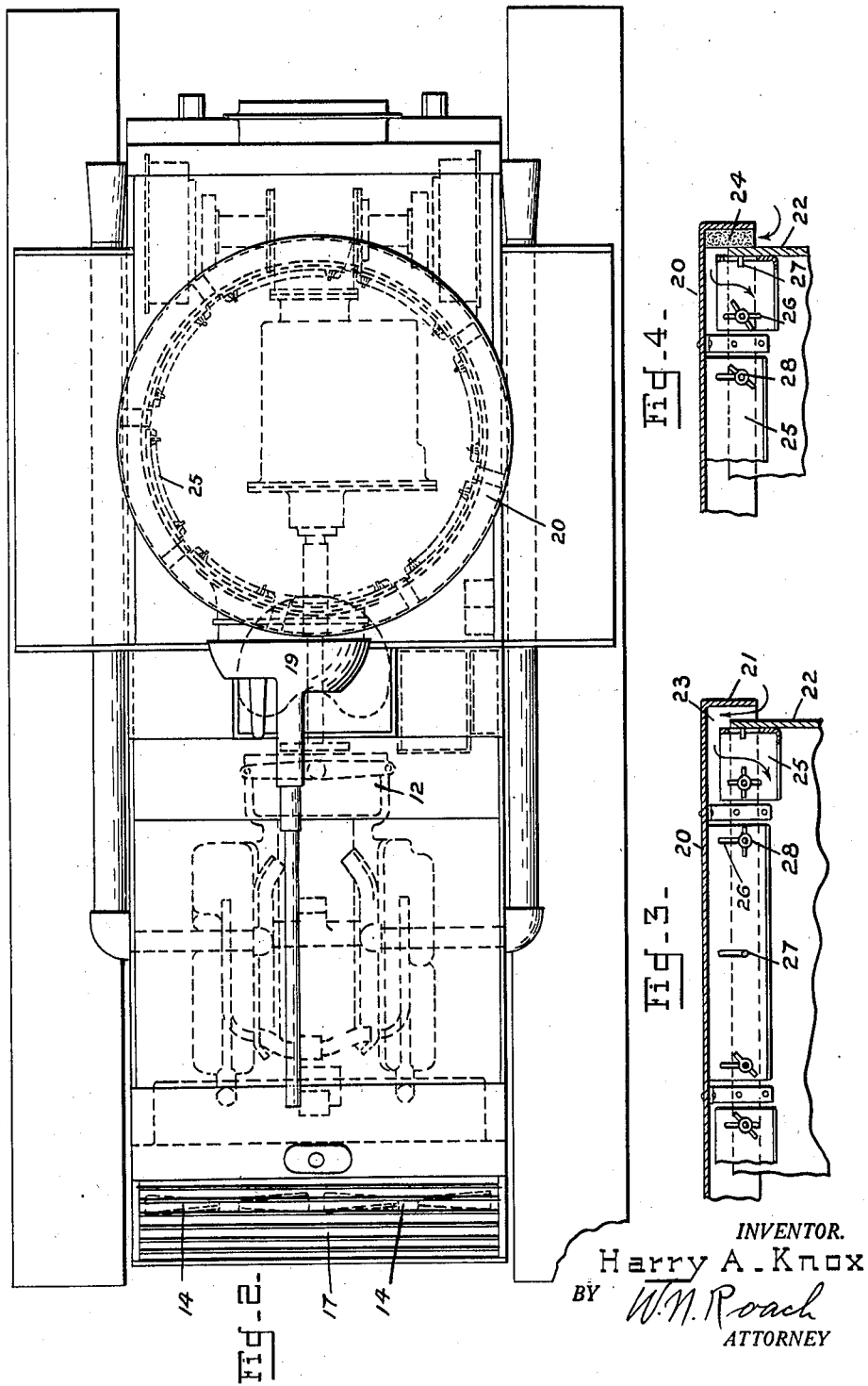
INVENTOR.
Harry A. Knox
BY W. N. Roach
ATTORNEY

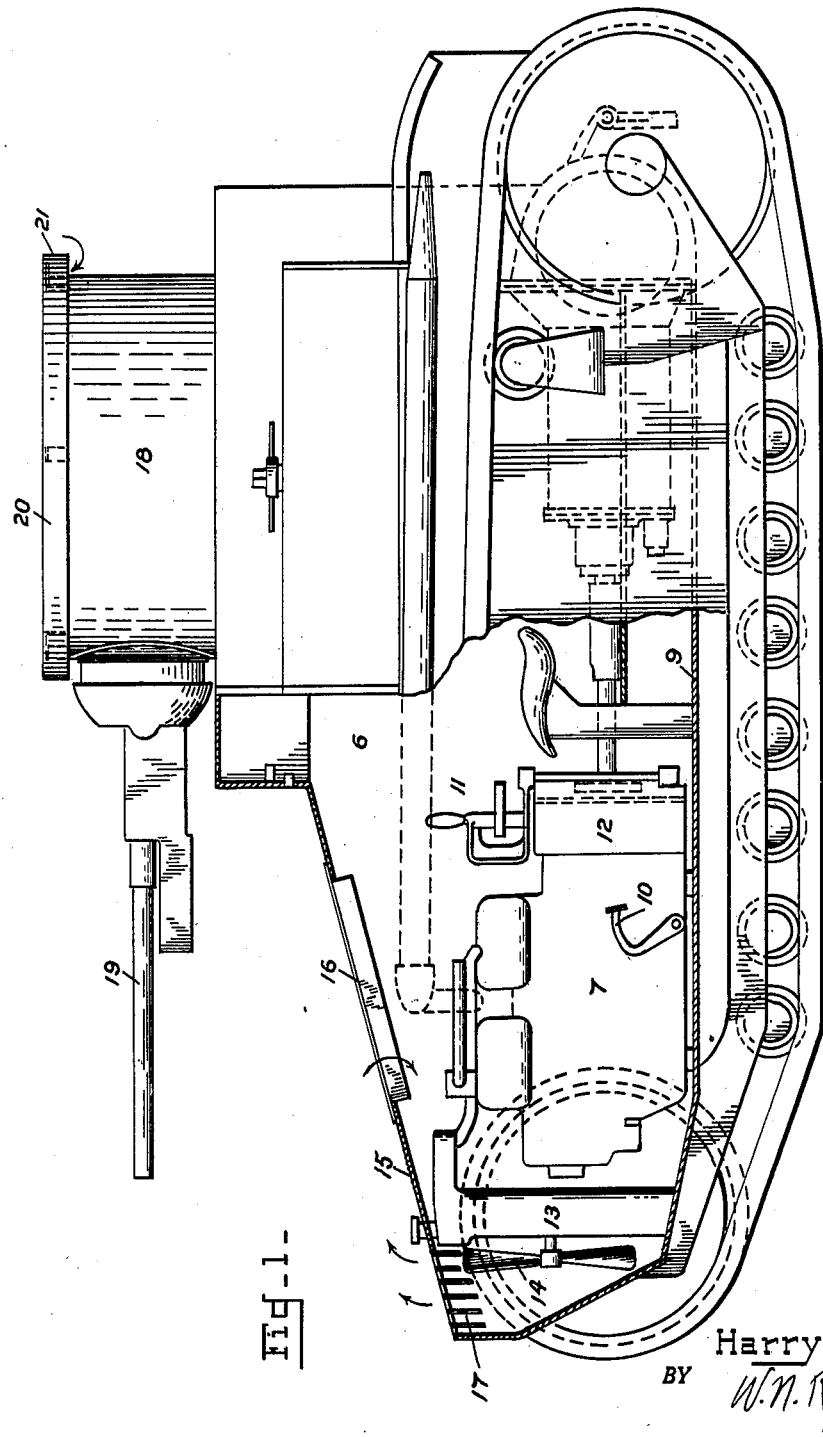

Patented May 19, 1931

1,805,771

UNITED STATES PATENT OFFICE

HARRY A. KNOX, OF DAVENPORT, IOWA

VEHICLE

Application filed November 4, 1929. Serial No. 404,812.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to a vehicle and, more particularly, to means for ventilating the same.

In armored track-laying vehicles the problem of conserving space and maintaining the weight at a minimum has resulted in an arrangement wherein the space provided for the occupants is directly in rear of and not separated from the power plant. In these designs the air for cooling the engine is drawn in at the front of the vehicle in the normal manner and in passing rearwardly through the compartment produces a discomforting temperature therein which seriously hinders the occupants in the performance of their tasks.

According to the present invention it is proposed to reverse the standard circulation of air heretofore employed and by exhausting the vehicle in front of the engine insures the maintenance of favorable working conditions in the compartment and allow the operator to be positioned directly in rear of a heavy duty engine. The inlets for the air are associated with the roof of the compartment and are provided with shutters, one set of which may be operated without interfering with a body of a chemical composition for neutralizing poison gases.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view partly in side elevation and partly in section of a vehicle constructed in accordance with the invention;

Fig. 2 is a plan view thereof; and

Figs. 3 and 4 are detail sectional views of a portion of the turret.

Referring to the drawings by numerals of reference:

The vehicle comprises an enclosed armor plate body 5 having but a single compartment 6, the forward portion of which houses a power plant 7 and the rear portion arranged for occupancy of a driver and passengers. There are no partitions separating the compartments and the seat 8 which is provided for the driver of the vehicle, is fixed to the main floor 9 directly in rear of the power plant, foot controls 10 being located on each side of and intermediate the length of the power plant while a hand control 11 is positioned over the master clutch 12 of the power plant.

A radiator 13 is placed in front of the power plant and a pair of fans 14, mounted side by side in front of the radiator and driven from the power plant, induce a circulation of air from rear to front. The sloping roof 15 of the forward portion of the body 5 contains a series of shutters 16 directly over the power plant for the purpose of admitting air into the compartment and a louvred opening in its extreme forward portion adjacent the fans for the purpose of discharging the air drawn in by the fans.

That portion of the body 5 arranged for the occupants is surmounted by a turret 18 carrying the armament 19. The roof 20 of the turret is formed with an apron 21 overhanging and spaced from the side walls 22 thereof to provide an opening 23 for the admission of air and to receive between the spaced walls a body or bodies 24 of a chemical composition having the property of neutralizing poison gases.

The opening 23 may be closed by means of a shutter or shutters 25 consisting of a plate placed on the inside of the upper margin of the turret walls and conforming to the curvature thereof. The shutters may be supported in any conventional manner, the specific mounting shown consisting of slots 26 formed in the shutter, each receiving a pin 27 fixed to the turret. A nut 28 is threaded on each of the pins for the purpose of clamping the shutter in position of adjustment. In cold weather the shutters 25 may be closed and the air for cooling the motor introduced solely through the shutters 16.

From the foregoing it will be seen that whenever the power plant is in operation the fans driven thereby will induce a circulation of air from rear to front and no discomfort due to the heat of the power plant will be caused to the occupants of the vehicle who are placed directly in rear of the power plant without intervening partitions. While the turret can be and is ventilated and the gunner located therein would not be subject to discomfort if additional ventilating means were provided near the floor of the compartment to exhaust air passing over the power plant from front to rear, yet under such an arrangement, the driver could not be located directly in rear of the power plant. Further, in a vehicle of this type, where conservation of space is of the utmost importance, it would be impractical to install deflecting plates and special channels to vent the air passed over the power plant.

I claim:

1. In a vehicle, an enclosed body forming a single compartment and including a turret, a power plant in the forward portion of the compartment, a radiator forwardly of the power plant, a fan forwardly of the radiator for drawing air through the radiator, a vent in the roof of the body adjacent the fan, shutters in the roof of the body above the power plant, shutters in the turret and a chemical composition placed outside of the shutters in the turret.

2. In a vehicle, an enclosed body forming a single compartment and including a turret, a power plant in the forward portion of the compartment, a radiator forwardly of the power plant, a fan forwardly of the radiator for drawing air through the radiator, a vent in the roof of the body adjacent the fan shutters in the roof of the body above the power plant and shutters in the turret.

3. In a vehicle of the class described, an enclosed body forming a single compartment, a power plant in the forward portion of the compartment, a radiator forwardly of the power plant, a fan forwardly of the radiator for drawing air through the radiator, a vent in the roof of the body adjacent the fan, and air inlets in the roof of the body above the power plant and in rear thereof.

4. In a vehicle of the class described, an enclosed body forming a single compartment, a power plant in the forward portion of the compartment, a radiator forwardly of the power plant, a fan forwardly of the radiator for drawing air through the radiator, a vent in the roof of the body adjacent the fan, and an air inlet in rear of the fan.

5. In a vehicle of the class described, an enclosed body forming a single compartment, a power plant in the forward portion of the compartment, a driver's seat directly in rear of the power plant, a fan in front of the power plant, air inlets in rear of the fan, and air outlets forwardly of the fan.

6. In a vehicle of the class described, an enclosed body forming a single compartment, a power plant in the forward portion of the compartment, a driver's seat in rear of the power plant, and means for drawing air from the rear of the compartment for discharge forwardly of the power plant.

HARRY A. KNOX.